INVENTORS.
Aden B. Meinel
Stanley Baskin
BY Donald H. Loomis
John B. Schroeder

Blair & Buckles
ATTORNEYS.

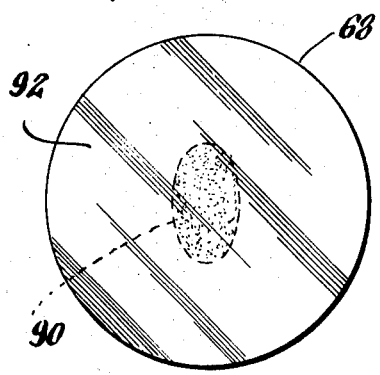
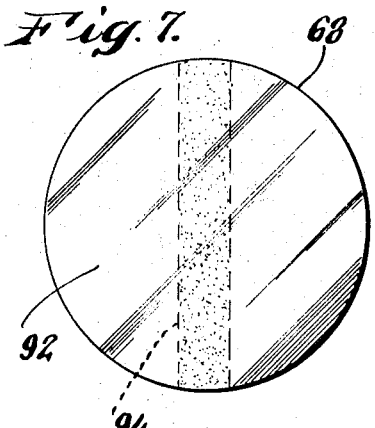
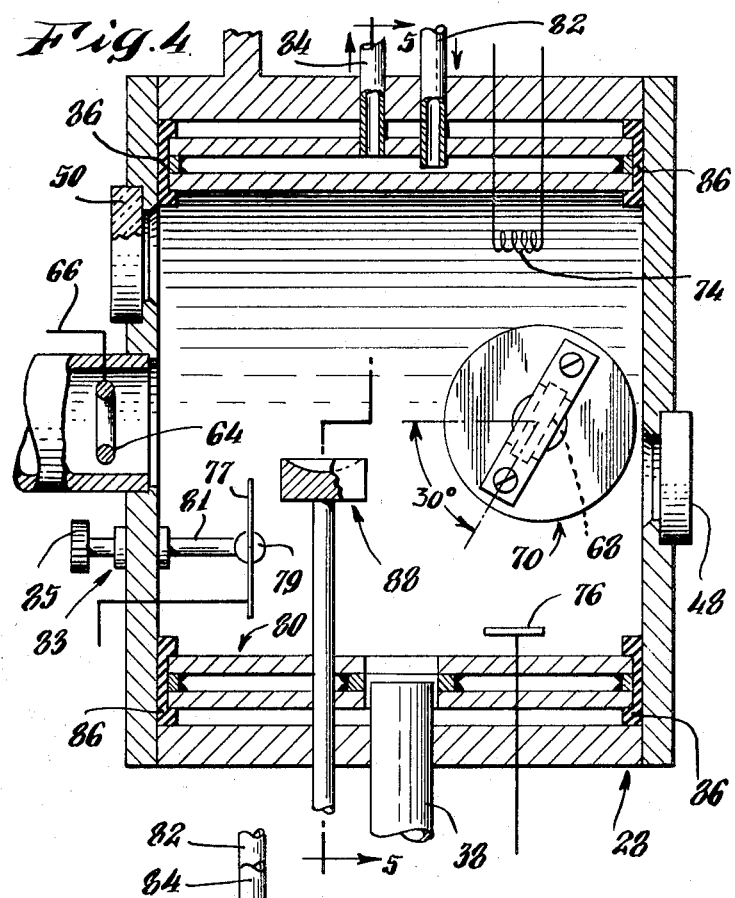
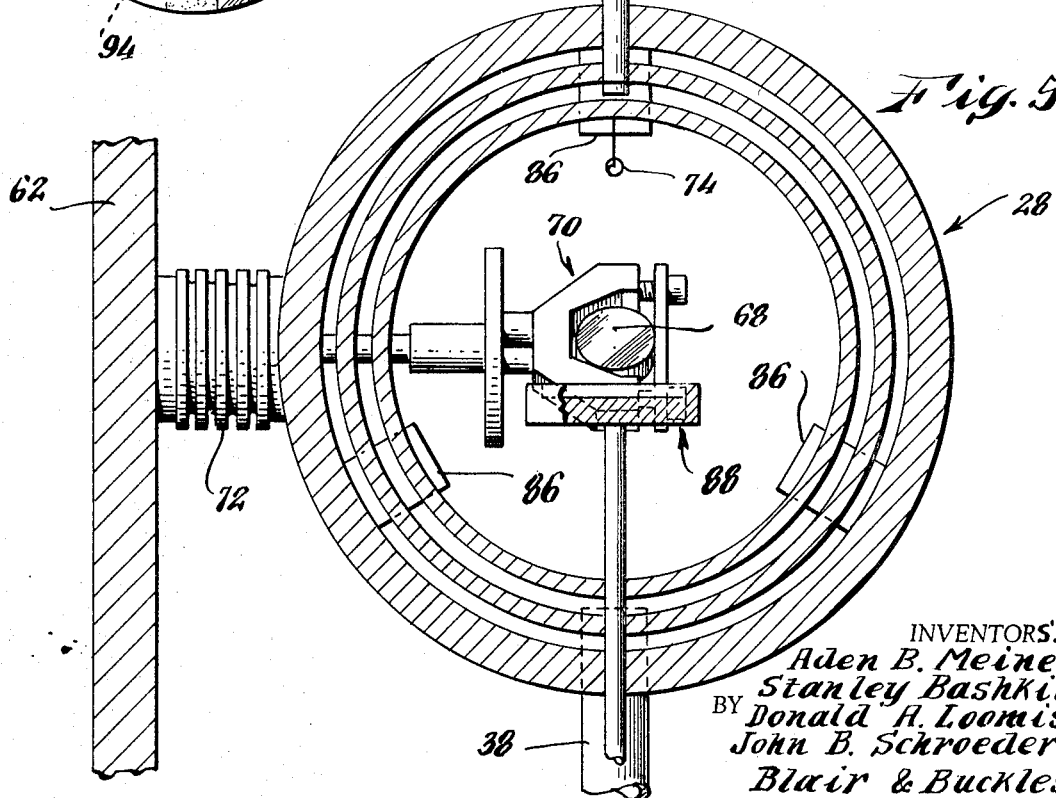

3,548,189
METHOD EMPLOYING ION BEAMS FOR POLISHING AND FIGURING REFRACTORY DIELECTRICS
Aden B. Meinel, 4115 E. 6th St. 85711; Stanley Bashkin, Rte. 2, Box 732B 85215; and Donald A. Loomis, 41 N. Montego Drive 85710, all of Tucson, Ariz.; and John B. Schroeder, Blue Spruce Circle, Weston, Conn. 06880
Filed June 16, 1965, Ser. No. 464,323
Int. Cl. H01j *37/26*
U.S. Cl. 250—49.5                                      22 Claims

ABSTRACT OF THE DISCLOSURE

The disclosed method for dimensioning and polishing surfaces of refractory dielectric materials comprises the initial step of examining the dielectric surface with an interferometer to locate those surfaces areas which extend above a desired surface contour. These high areas are then bombarded with positive ions of an ion beam. The current density of the beam and the duration of bombardment are controlled so as to erode away these high areas and thus produce the desired surface contour.

---

This invention relates to a method and apparatus for polishing and figuring or dimensioning the surfaces of refractory dielectrics. More particularly, it relates to a method and apparatus for polishing or figuring such surfaces by bombarding them with a beam of positive ions. We have discovered that an intense beam of energetic positive ions will erode away refractory dielectric surfaces formed of quartz, glass and the like and will cause such surfaces to become substantially perfectly smooth.

The invention is applicable to polishing any refractory dielectric element or part to which it is desirable to impart an extremely smooth surface. The invention is similarly applicable to figuring or dimensioning refractory dielectric elements or parts to extremely small tolerances.

Communication and reconnaissance systems employing optical elements are fundamentally limited by two factors. These are: atmospheric turbulence and contamination; and the overall quality of the optical system. Atmospheric disturbances may be eliminated by employing closed or evacuated systems, or in the case of astronomical observations by placing the optical system at the top of the atmosphere by means of a balloon, rocket or satellite. The quality of an optical system depends on the effective aperture of the system and the quality of the optical elements employed therein. When the surface contour of an optical element is of such high quality that the elements cannot be improved by changing its contour, it is said to be diffraction limited.

Diffraction limited optical elements must have surfaces contoured to tolerances of fractions of one wave length of light, i.e. to hundreds of angstroms. One angstrom equals one one hundred millionth of a centimeter. Such tolerances cannot be maintained by automatic manufacturing methods. Diffraction limited optical elements are manufactured by hand. This is an unbelievably tedious and expensive process. The optical elements are first ground and polished on the best available automatic equipment. Thereafter, small areas on the elements above the desired surface are polished away by hand. During this step the element heats up at the surface being polished and distorts. The element must then be allowed to reach thermal equilibrium and the surface checked interferometrically. Interferometry uses light waves to measure surfaces to fractions of a wave length of the light employed and essentially provides an elevation contour map of the surface. In this way the deviation of the surface from that desired may be measured to a fraction of a wave length. This process must be repeated many times to complete the figuring of the element.

During the final stage of preparing a diffraction-limited surface, a polishing compound is applied for a time and with a pressure as dictated by the experience of the optician. Thus, the element is figured by chipping successively smaller fragments from the surface. The resulting surface is, therefore, haphazardly cracked and crazed on a microscopic scale. These defects cause diffuse reflection or refraction of light. This light does not proceed through an optical system along the desired paths. It is either lost or still worse results in a diffuse background illumination reducing contrast.

Diffuse scattering of light at the surface of an optical element increases at shorter wave lengths and is a major problem in ultraviolet optics.

The method of figuring by hand polishing puts great mechanical stress on an optical element. This means that the optical blank from which such an element is fabricated must be very thick and heavy in order to prevent transient or permanent mechanical distortion during fabrication. As a consequence, the weight of optical elements restricts the performance of air-borne and space observatories.

Sapphire windows and lenses have important application in the transmission of light in the near ultraviolet. Sapphire is very fragile and much of the cost of these elements is due to the extreme care that must be exercised in handling them during figuring. The microscopic surface defects induced in these elements during conventional grinding and polishing are larger than those produced in vitreous optics. These defects produce large amounts of diffuse scattered light which is, as previously stated, an important limitation on optical systems for the ultraviolet region of the spectrum.

Furthermore, only simple optical contours such as spheres and parabolas may be brought to the diffraction limit by prior art hand grinding and polishing. Many modern optical systems employ complicated so-called aspherical contours. Diffraction limited aspherical optical elements cannot be made by prior art methods.

The demands that developing technology puts upon the precision fabrication of many items appear in ever-reduced tolerances on various dimensions. Devices known as gauge blocks having precisely oriented and dimensioned surfaces are important tools for insuring that specifications of size are met to the requisite precision. Because of their dimensional stability, refractory dielectrics such as fused silica could be used to make superior gauge blocks if relatively inexpensive methods were available to dimension and shape their surfaces.

Many modern machines operate at extreme temperatures, both high and low. Refractory dielectrics, particularly ceramic materials, are being increasingly employed in such machines. Bearings and elements in contact with moving fluids in these machines should be as smooth as possible and precisely contoured to reduce friction and turbulence. Prior art methods of polishing and figuring these elements are extremely expensive, often prohibitively so.

Jewels such as diamonds, corundum (sapphires, rubies and the like) and other refractory materials are ground and polished by methods similar to those employed in figuring optical elements. The "fire" of gem stones largely depends on the amount of light reflected rather than scattered from their facets. Rough polished surfaces increase the friction of jeweled bearings. Microscopic surface defects decrease the effectiveness of jeweled cutting tools such as drills, saws, stylii and the like.

The leakage resistance and breakdown voltage of refractory dielectric electrical insulators are adversely affected by surface defects. In some applications insulators must be dimensioned to precise tolerances.

The resonant frequency of a piezoelectric oscillator is dependent on its thickness. More precise control of the thickness of such crystal and ceramic oscillators will make possible more precise control of their resonant frequencies.

We have discovered that high energy positive ions can erode glass, quartz and other refractory dielectrics and substantially improve the smoothness of the surfaces thereof. This effect may be used in the manufacture of high quality refractory dielectric optics, gauge blocks, bearings, machine parts, gems, oscillators, electrical insulators and the like.

It is therefore an object of the present invention to improve the arts of optics, metrology, mechanics, lapidary, electrical engineering, electronics and all others requiring smooth surfaced, precisely contoured elements or parts.

Another object of the invention is to provide a method and apparatus for the manufacture of smooth surfaced, precisely contoured elements and parts.

A further object of the invention is to provide a method and apparatus of the above character for the manufacture of such elements and parts of lighter weight than heretofore possible.

A still further object of the invention is to provide a method and apparatus of the above character not requiring hand polishing.

Another object of the invention is to figure and polish surfaces of such elements and parts in a vacuum.

Still another object of the invention is to provide automatic methods and apparatus for figuring and polishing such elements and parts in a vacuum.

Yet another object of the invention is to provide methods and apparatus of the above character for manufacturing elements and parts of the above character of refractory dielectric materials.

A particular object of the invention is to provide methods and apparatus of the above character for the manufacture of diffraction limited optical elements.

Another particular object of the invention is to provide methods and apparatus of the above character for the manufacture of gauge blocks.

Still another particular object of the invention is to provide methods and apparatus of the above character for the manufacture of bearings and machine parts.

A further particular object of the invention is to provide methods and apparatus of the above character for cutting and polishing precious stones.

A still further particular object of the invention is to provide methods and apparatus of the above character for the manufacture of electrical insulators.

Yet a further particular object of the invention is to provide methods and apparatus of the above character for the manufacture of piezoelectric oscillators.

Other objects of the invention will in part be obvious and will in part appear hereinafter.

The invention accordingly comprises one or more steps and the relationship of one or more of such steps with respect to each of the others, and apparatus embodying features of construction, combinations of elements and arrangements of parts which are adapted to effect such steps, all as exemplified in the following detailed disclosure. The scope of the invention will be indicated in the claims.

For a fuller understanding of the nature and objects of the invention, reference should be had to the following detailed description taken in connection with the accompanying drawings in which:

FIG. 4 is an enlarged cross sectional view of a portion of the apparatus shown in FIG. 1;

FIG. 5 is a cross sectional view taken along the line 5—5 of FIG. 4;

FIG. 6 is an enlarged front view of an element being figured or polished;

FIG. 7 is a front view, similar to FIG. 6, of another element being figured or polished.

Similar reference characters refer to similar elements throughout the several views of the drawings.

The method of the present invention generally comprises figuring or polishing the surfaces of refractory dielectrics by bombarding such surfaces with beams of energetic positive ions. Such bombardments, when controlled as described below, cause a uniform removal of matter from the area under bombardment. Such uniform removals induced by beams of energetic positive ions have not been observed prior to our discovery and invention. In addition, such bombardments create a "fire-polished" surface, i.e., one substantially free of microscopic defects.

We prefer to use beams of substantially uniform current density for figuring and polishing, as such beams remove material uniformly wherever the beam hits the target material. However, nonuniform beams may be employed by scanning the beam over the surface to be eroded to thus even out inhomogeneities in the beam current. In scanning, beams with smoothly varying current cross sections are preferred, but are not required.

The beam is swept across the surface to be figured or the surface is moved with respect to the beam. This scanning of the surface is nonuniform in figuring, dimensioning or contouring so that more material is removed from some areas than others in accordance with the deviation of the surface from that desired. The surface may be monitored interferometrically. For elements having a low thermal coefficient of expansion, this monitoring is continuous and the beam may be continuously modified in accordance with the removal attained. Otherwise, the monitoring and bombarding steps are performed alternately.

Initially, we found that a fused silica optical flat exposed to an ion beam from a one-half to two million volt positive ion Van de Graaff accelerator for approximately ten hours had a depression formed therein the diameter of the beam and 600 Angstroms deep. The bottom surface of the depression was of exceptional optical quality, at least equal in flatness to that of the surrounding areas of the flat, but without the microscopic surface flaws which characterize optical surfaces prepared in traditional ways. The flat had been subjected to positive ions formed of the elements hydrogen, helium, nitrogen and various other terrestrial vacuum systems contaminating gases.

Figure 1:
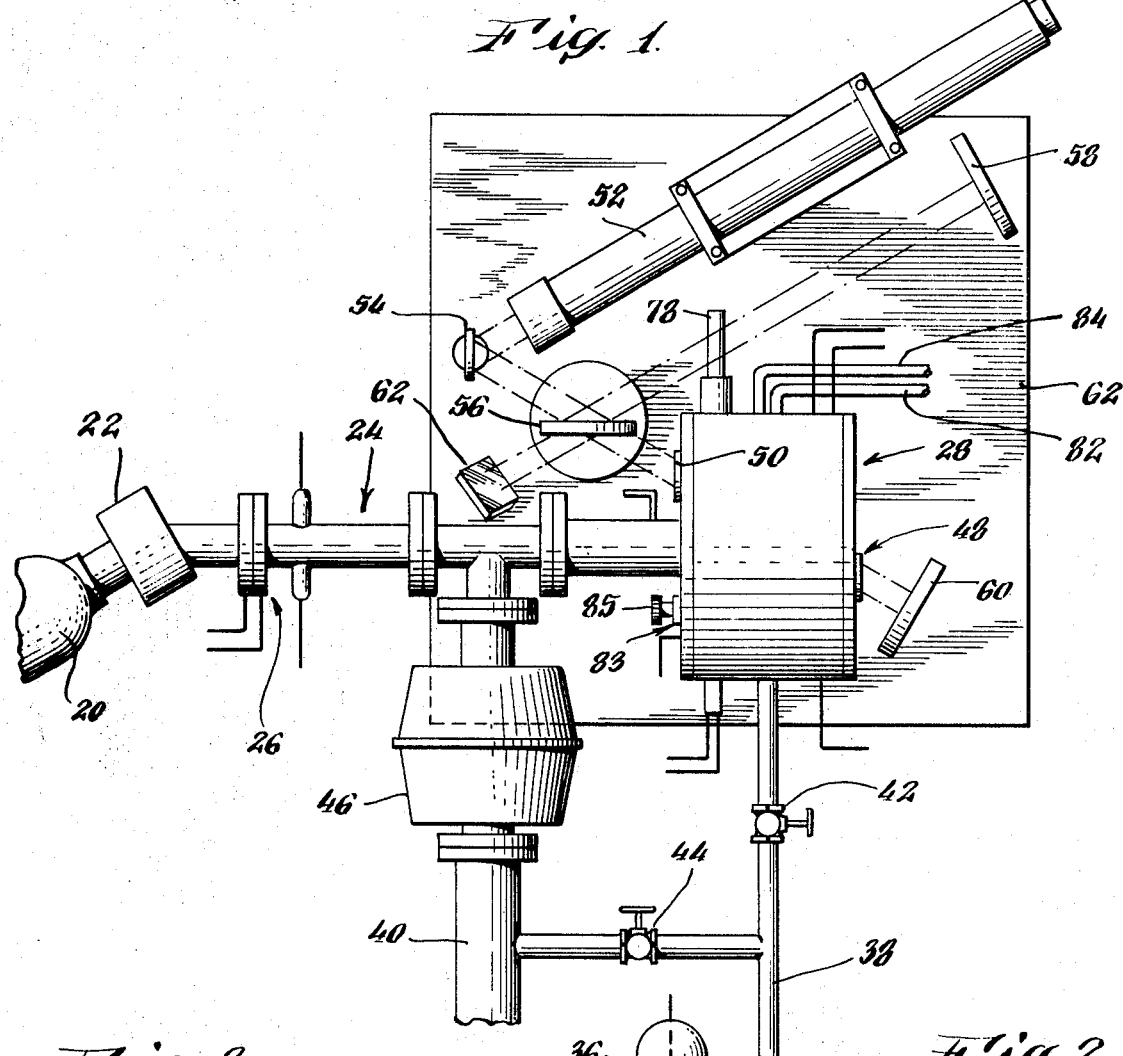
FIG. 1 is a side view, partially in schematic form, of apparatus for figuring and polishing optical surfaces according to the present invention.
Figure 3:
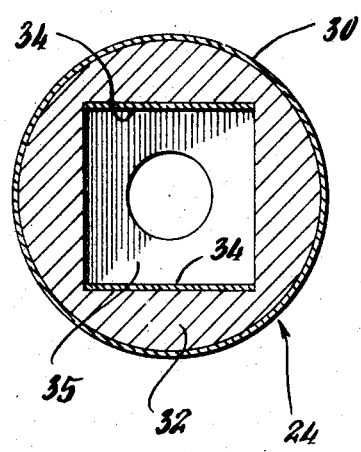
FIG. 3 is a cross sectional view taken along the line 3—3 of FIG. 2.

We have subsequently figured glass surfaces in the apparatus shown in FIG. 1. This apparatus comprises a positive ion source, an accelerator 20 of the Van de Graaff type; a selector or mass spectrometer 22 comprising a strong magnetic field for deflecting the beam from the accelerator 20; electrical beam deflecting apparatus generally indicated at 24; electromagnetic beam focusing apparatus generally indicated at 26, and a figuring chamber generally indicated at 28. The accelerator 20, mass spectrometer 22 and focusing apparatus 26 are conventional. The deflection apparatus 24 is shown in detail in FIG. 2.

Figure 2:
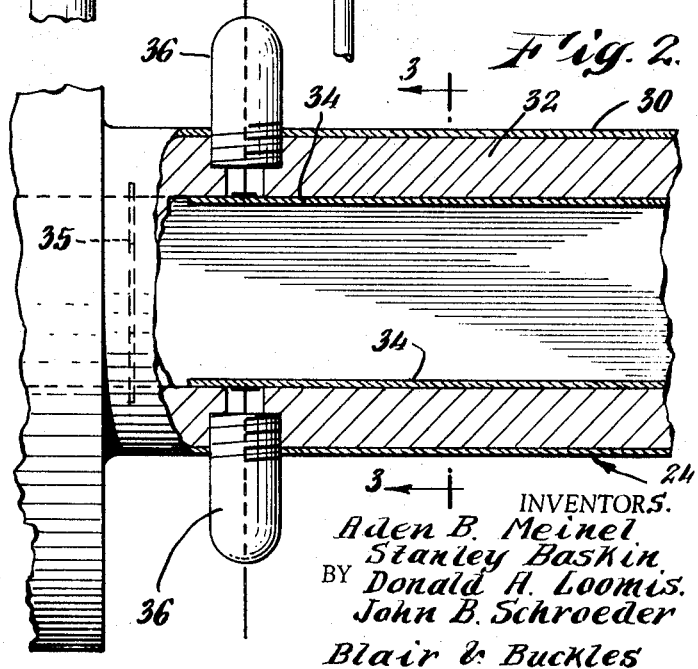
FIG. 2 is an enlarged fragmentary view, partially cut away, of a portion of the apparatus of FIG. 1.

Referring to FIG. 2, the beam deflection apparatus comprises a metal tube 30 containing a pair of flat, parallel, insulated, metal plates 34. The insulating material 32 is protected from the ion beam by metal plate 35. The parallel metal plates 34, which form an electrical capacitor, are connected to a source of controllable high voltage (not shown) through insulating vacuum seals 36 of conventional construction. Thus, the ion beam from the accelerator 20 may be deflected through a predetermined angle by applying the proper potential to plates 34 or the beam may be swept back and forth by applying an oscillating potential to plates 34.

Again referring to FIG. 1, the entire apparatus is evacuated through pipe 38 connected to a mechanical pump (not shown) and through pipe 40 connected to an ultra high vacuum pump (also not shown). A pair of valves 42 and 44 permits the selective connection of the apparatus to the mechanical pump and the ultra high vacuum pump.

A cold trap 46 is provided in the pipe 40 leading to the ultra high vacuum pump as is conventional. A conventional diffusion pump may be employed, but other kinds of ultra high vacuum pumps may also be used. For reasons that will become apparent below, we prefer to use a pump that employs no carbon containing materials.

The figuring chamber 28 is provided with a pair of optically flat windows 48 and 50 for observing the element being figured. The element may be observed interferometrically by means of a Twyman-Green interformeter comprising laser 52, mirror 54, beam splitter 56, reference mirror 58, a second reference mirror 60 and deflecting mirror 62. The beam paths between the laser 52, mirror 54, beam splitter 56, mirrors 58 and 60 and 62 are shown and the beam is deflected by mirror 62 toward the observer where the interference pattern may be observed or photographed. The entire optical apparatus is mounted on a massive support plate 63 to isolate the apparatus from mechanical vibrations.

Referring to FIGS. 4 and 5, an inulsated metal ring 64 is located at the entrance to the chamber 28. The ring 64 is shielded from the ion beam and is held at an electrical potential of minus 300 volts or thereabouts with respect to the chamber wall. The voltage is supplied by a standard D.C. high voltage supply (not shown) through lead 66. The ring 64 prevents electrons from entering or leaving the figuring chamber 28.

An element 68 to be polished is located within the figuring chamber in the path of the beam of positive ions from accelerator 20. It is held in a support generally indicated at 70. This support is mounted through a metal bellows vacuum seal 72 directly to the massive support plate 63. The support 70 can preferably be moved inside the vacuum chamber both rotationally and laterally with respect to the beam from the accelerator by conventional means (not shown).

A heated cathode 74 and an anode 76 are located within the polishing chamber 28. The cathode and anode are connected to a power supply (not shown), providing approximately 300 volts difference in potential therebetween, and a heating current which when applied to the cathode causes the cathode to emit electrons. The difference in potential then causes a current of low energy electrons to pass across the surface of the element 68 for the purpose of neutralizing the ions of the beam after said ions have impinged upon the optical element 68 and transferred their energy to the element 68. Said neutralization prevents local concentrations of positive electric charge on the surface and the sparking which would ensue were such concentrations to develop.

It will be seen that the element 68 may be observed either in transmission or reflection through the windows 48 and 50. However, since the chamber 28 is connected to the accelerator 20, and is also supported from the floor of the laboratory, we have found that the chamber 28 may be vibrated thereby or by other equipment required in the building housing the accelerator. By mounting the support 70 and the other optical elements on the heavy support 63, FIGS. 1 and 5, much of the effect of this vibration can be eliminated. However, we have found it desirable to mount a correction plate 78 on the chamber 28, as shown in FIG. 1. Plate 78 vibrates with the windows 58 and 40 and disturbs the reference beam of the interferometer in substantially the same manner as the windows 50 and 48 with the result that observations on the sample are not hampered by said vibrations.

The beam may be interrupted and the ion beam current measured by rotating a metal plate 77 into the path of the beam. Plate 77 is mounted via an electrical insulating arm 79 to the shaft 81 of a standard rotary seal 83. The plate 77 is rotated by means of knob 85 mounted on the outer end of shaft 81.

We have found that the polishing process cannot be effectively carried out in the presence of carbon contamination within the polishing chamber 28. This means that the entire apparatus must be kept as free as possible of carbon. Furthermore, we provide the chamber with a cold trap, generally indicated at 80, filled with liquid nitrogen or other coolant. Cold trap 80 provides a surface on which stray carbon atoms are likely to stick on contact. The cold trap also serves as an infrared radiation sink absorbing some of the heat generated in the element 68 and collects a large portion of the heavy particles eroded from the element 68. The cold trap 80 is filled by means of pipes 82 and 84 and is supported in chamber 28 by means of heat insulating supports 86.

After the element 68 has been polished or figured, it may be coated by means of conventional evaporative coating apparatus, schematically indicated at 88, without breaking the vacuum. This eliminates the problem of the prior art of obtaining a very clean surface after the element has been figured so as to provide a good adhesion between the coating and the element. The boat 88 may be heated by focusing the beam on it or by conventional electrical means.

Furthermore, the element 68 may after figuring be bombarded with low energy positive ions at low current densities to alter the surface layer as disclosed in U.S. Pat. No. 2,702,863 of Jorgen Koch issued Feb. 22, 1955 and as investigated by R. L. Hines and R. Arndt, reported in the Physical Review, vol. 119, No. 2, July 15, 1960 in an article entitled Radiation Effects of Bombardment of Quartz and Vitreous Silica by 7.5 kev. to 59 kev. Positive Ions. The coating and altering steps are particularly important in polishing and figuring optical elements.

FIG. 6 shows the pattern 90 of the ion beam on the surface 92 of the element 68. FIG. 7 shows the pattern 94 formed when the beam is repeatedly deflected vertically by the electrostatic deflection apparatus 24 of FIG. 1. The width of the pattern 94 and the size of the pattern 90 may be varied by varying the focus of the beam by means of the electromagnetic quadrupole focusing apparatus 26 of FIG. 1 to correct areas of different size on the surface of the element 68. A second deflector may be employed for a horizontal sweep. Two deflectors can be employed to direct the ion beam to any desired spot on the surface of the work piece.

The effect of the erosion of the surface 92 may be observed in the interferometer. In the case of fused silica this may be done simultaneously with the erosion. However, in the case of some optical glasses having high coefficients of expansion due to heat, the eroding effects are masked by the heating effects produced by the beam impinging on the element 68 and the surface must be allowed to cool before reliable observations can be made.

In our invention we have found that protons—ionized hydrogen—may be conveniently used. For example, a fused silica sample was bombarded with 1.6 mev. (million electron volts) protons over an area of approximately one square centimeter at a current density of 11 microamperes per square centimeter for 4.3 hours. This produced a uniform depression in the fused silica 1500 angstroms deep having an apparently perfect optical surface. However, when the current density was reduced to 6 microamperes per square centimeter and the sample bombarded for 3.25 hours, no noticeable erosion of the sample occurred.

Furthermore, another fused silica element irradiated with 1 mev. protons at a current density of 12 microamperes per square centimeter for 3.25 hours, produced an eroded area approximately 2500 angstroms deep. When the energy of the protons was reduced to 0.5 mev. and the current not allowed to increase over 15 microamperes per square centimeter, after approximately 4 hours a 3000 angstrom deep erosion was produced.

When BK–7 optical glass was irradiated with 1 mev. protons at a current density of 19 microamperes per square centimeter for 2.5 hours, the surface of the glass was eroded uniformly to a depth of 1125 angstroms. Similarly, when CER–VIT optical glass was irradiated with 0.5 mev. protons and the current density varied from 6 to 18 microamperes per square centimeter for 2.3 hours, the surface was eroded uniformly to a depth of approximately 600 angstroms.

We believe that the uniform erosion is the result of having the particle energies high enough so that they are not deflected by space charges at the surface or by crystalline anisotropy in the surface of the dielectric elements being bombarded. Thus, the average energies of the beam should be of the order of 60,000 electron volts or higher. Furthermore, we believe that significant removal of material uniformly without creating the stresses crazing and change in refractive index reported in the prior art (e.g. Radiation-Induced Stress Relaxation in Quartz and Vitreous Silica by W. Primak, 35 Journal of Applied Physics 4, April 1964) requires beam power densities greater than 1 watt per square centimeter.

We have demonstrated that at power densities of ten watts per square centimeter, which we find quite sufficient for our process, the surface is rendered both flat and free from microscopic defects to a hitherto unattainable degree.

We have demonstrated that on oblique angle of incidence of the ion beam on the surface is apt to be more effective in removing material than bombardment at normal incidence.

We have found that more material is removed at a faster rate when the ion beam impinges on the surface at an acute angle and generally use an angle of about 30 degrees. This being the most acute angle at which high enough current densities may be delivered to the surface by the accelerator available to us.

We further believe that the uniform removal is enhanced by the fact that the ion beam we prefer to use is very uniform in ion density or current cross section.

The element 68 has been successfully figured by deflecting the beam with respect to the surface of the element 68 or by moving the element 68 with respect to the beam so as to selectively erode areas of the surface with the beam, thus competing successfully with the methods of the prior art. Furthermore, the beam, as previously described, may be focused or defocused so that the beam is of any desired size relative to the area desired to be worked on.

We further believe that uniform removal is enhanced when the ions have substantially the same energy. This condition is produced by the momentum selector 22 shown in FIG. 1.

The process may also be carried out using a neutral plasma, in which case the charge neutralizing electrodes 74 and 76 are not needed. The intense energetic neutral plasmas that are required may be produced by conventional plasma generators of the prior art.

We do not wish to be bound by any theory concerning the mechanisms involved in the uniform removal of large quantities of matter from refractory dielectrics by ionic bombardment. It does appear, however, that since on the average only about one atom is removed by each ion hitting the surface being bombarded, high current beams and rather long exposure times must be employed compared with prior art irradiations.

One of us believes that ion beams of high current density and power must be employed. It is suspected that these significantly heat the bombarded surface permitting the diffusion of absorbed ions out of the surface and anneals out radiation stresses resulting from the bombardment. It also appears somewhat likely that the power and current density of the ion beam must be high enough to impart a general mobility to the atoms of the surface being bombarded so that they continuously spread over the surface in a smooth film.

It may also be that when very intense beams are employed, the mobility of the surface atoms is so great as to in effect permit evaporation of atoms from the surface as well as removal of atoms by direct collision with ions in the beam.

Our experiments, as described above, indicate that current densities of the order of 5 microamperes per square centimeter or greater are required. Intensities of greater than one watt per square centimeter similarly appear necessary to provide uniform removals.

While we have described the use of proton beams, other positively charged ions may be used. We have successfully employed a singly ionized hydrogen molecule ($H_3^+$) and singly ionized neon ($Ne^+$).

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

1. The method of figuring and polishing surfaces of a refractory dielectric comprising:
   (A) interferometrically examining the surface contour of a refractory dielectric;
   (B) locating those areas of the surface which extend above a desired surface contour; and
   (C) selectively bombarding only the located areas with ions of an ion beam to erode away sufficient refractory dielectric material to produce a surface conforming precisely to the desired contour.

2. The method of claim 1, wherein the refractory dielectric is formed of a material selected from a group consisting of quartz, fused silica, glasses, partially devitrified glasses, diamond, corundum, and ceramics.

3. The method of claim 1 which further includes:
   (A) maintaining the bombarded surface free from local concentrations of electric charge.

4. The method of claim 1 which further includes:
   (A) controlling the beam such that the current density thereof at the surface is greater than 5 microamperes per square centimeter.

5. The method of claim 1 which further includes:
   (A) controlling the beam to have an intensity at the surface of at least one watt per square centimeter.

6. The method of claim 1 which further includes:
   (A) relatively orienting the beam and the surface such that the ions impinge thereon at angles substantially differing from 90°.

7. The method of claim 1 which further includes:
   (A) relatively orienting the beam and the surface such that the ions impinge thereon at an angle of approximately 30° to the surface.

8. The method of claim 1 which further includes:
   (A) providing a vacuum substantially free of carbon contamination in which the positive ion bombardment is carried out.

9. The method of claim 1 which further includes:
   (A) exposing the surface to an electron beam concurrently with the ion beam.

10. The method of claim 1 which further includes:
    (A) concurrently with the ion bombardment, exposing the surface to an ultra cold surface.

11. The method of claim 1 which further includes:
(A) controlling the beam such that the ions have substantially the same energy.

12. The method of claim 1 which further includes:
(A) controlling the beam so as to be of substantially uniform current density throughout its cross-section.

13. The method of claim 1 wherein:
(1) said selective bombardment is accomplished by deflecting the ion beam with respect to the surface.

14. The method of claim 1 wherein:
(1) said selective bombardment is accomplished by moving the surface with respect to the beam.

15. The method of claim 1 wherein:
(1) said bombarding and examining steps are carried out alternately.

16. The method of claim 1 wherein:
(1) said bombarding and examining steps are carried out simultaneously.

17. The method of preparing an optical surface comprising:
(A) positioning an optical element having an optical surface in a vacuum;
(B) removing selected portions of the optical surface to produce an optically smooth surface finish by bombarding the optical surface with positive ions of an ion beam;
(C) coating the optically smooth surface; and
(D) then breaking the vacuum.

18. The method of figuring and polishing surfaces of a refractory dielectric comprising:
(A) interferometrically examining the surface contour of a refractory dielectric;
(B) locating those areas of the surface which extend above a desired surface contour; and
(C) selectively bombarding only the located areas with particles of a neutral plasma to erode away sufficient refractory dielectric material to produce a surface conforming precisely to the desired contour.

19. The method of forming a gauge block from refractory dielectric material comprising:
(A) interferometrically examining a surface of a refractory dielectric body;
(B) locating those areas of the surface which extend above a desired surface contour; and
(C) selectively bombarding the located surface areas with ions of an ion beam to dimension and polish the body surface to a desired gauge block size.

20. The method of forming precision bearings from refractory dielectric material comprising:
(A) interferometrically examining the surface contour of a refractory dielectric body;
(B) locating those areas of the body surface which extend above a desired surface contour; and
(C) selectively bombarding the located surface areas with ions of an ion beam to dimension and polish the body surface to predetermine bearing specifications.

21. The method of working the surfaces of a jewel comprising:
(A) interferometrically examining the jewel surfaces;
(B) locating those areas of the surfaces extending above desired surface contours; and
(C) selectively bombarding only the located areas with ions of an ion beam to dimension and polish the jewel surfaces to desired surface contours.

22. The method of processing an electrical insulator formed of refractory dielectric material comprising:
(A) interferometrically examining the surface of an insulator;
(B) locating those areas of the surface extending above a predetermined surface contour; and
(C) selectively bombarding only the located areas with ions of an ion beam to polish the insulator surface and thereby impart desired electrical characteristics to the insulator.

References Cited

UNITED STATES PATENTS

| | | | |
|---|---|---|---|
| 2,467,224 | 4/1949 | Picard | 250—49.5(1) |
| 2,702,863 | 2/1955 | Koch | 250—49.5(7) |
| 2,890,342 | 6/1959 | Columbe | 250—49.5(1) |
| 2,944,172 | 7/1960 | Opitz et al. | 250—49.5(0) |
| 3,192,892 | 7/1965 | Hanson et al. | 118—49.1 |
| 3,341,442 | 9/1967 | Kay | 204—192 |
| 3,351,731 | 11/1967 | Tanaka | 219—69 |
| 2,806,124 | 9/1957 | Gage | 219—121 |
| 2,858,444 | 10/1958 | Leisegang | 250—49.5(2) |
| 3,050,616 | 8/1962 | Gage | 219—69 |

OTHER REFERENCES

Journal of Applied Physics, vol. 32, Hines et al., pp. 202–204.

ARCHIE R. BORCHELT, Primary Examiner

A. L. BIRCH, Assistant Examiner

U.S. Cl. X.R.

156—20; 219—68, 121